April 12, 1932.  W. LAMBACH  1,853,438
POT WITH SIGNAL WHISTLE FOR BOILING MILK IN STEAM BATHS
Filed April 13, 1929
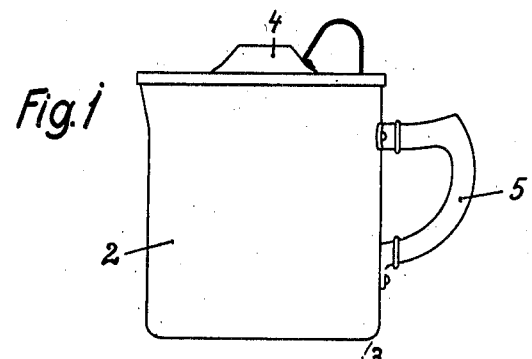
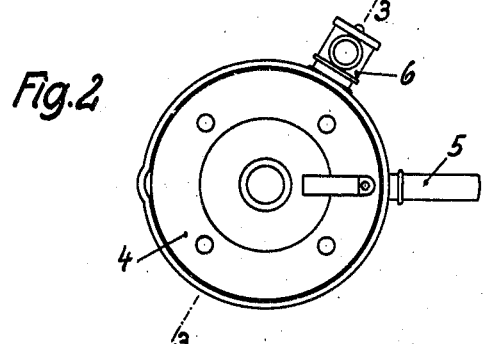
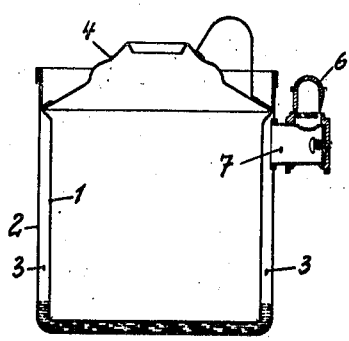
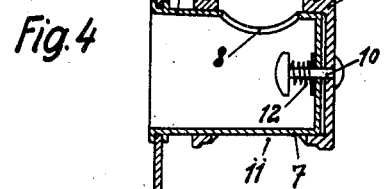
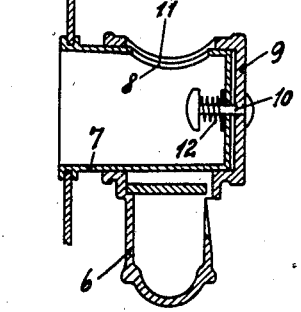

Patented Apr. 12, 1932

1,853,438

UNITED STATES PATENT OFFICE

WILHELM LAMBACH, OF BARMEN-LANGERFELD, GERMANY

POT WITH SIGNAL WHISTLE FOR BOILING MILK IN STEAM BATHS

Application filed April 13, 1929. Serial No. 354,922.

This invention relates to a pot for boiling milk, in which the milk containing vessel is immersed in a vessel containing water and steam heated from the outer side, the milk vessel being heated by the water and steam bath.

In order to indicate the sufficient heating of the milk and to prevent boiling over, the signal whistle is mounted on the closed water and steam vessel, the steam being discharged through this whistle so that a whistle signal is produced.

In order that the socket, in which the whistle is mounted, may be used as charging socket, the whistle is either removably connected with said tubular socket or arranged in such a manner that it can be adjusted so that the charging hole and steam outlet is liberated. The latter arrangement presents the advantage that the whistle cannot be mislaid, and that the manipulation is simpler than when the whistle is removable.

The adjustable whistle is fixed on the tubular socket by means of a spring which pulls the whistle against the conical tubular socket, when said whistle is turned accordingly so that a well packed connection of the whistle is ensured even after a long service.

An embodiment of the invention is illustrated, by way of example in the accompanying drawings in which:

Fig. 1 is an elevation of the milk boiler,
Fig. 2 is a top plan view of the same,
Fig. 3 is a longitudinal section on line 3—3 of Fig. 2.
Figs. 4 and 5 show in section the whistle in approximately natural size in two different positions.

The inner vessel 1 is inserted in an outer vessel 2 so that between these two vessels an annular space 3 remains designed to be partly filled with water through which the heat which heats the outer vessel is communicated to the inner vessel.

The upper edge of the inner vessel is bent outward and then again inward so that a bead is formed which tightly bears against the inner surface of the outer vessel 2. The inner vessel 1 is closed by an overflow lid 4 commonly used in milk boilers (Fig. 3).

The outer vessel 2 has a handle 5 and a signal whistle 6 (Figs. 1 and 2). The signal whistle 6 is mounted on a tubular socket 7 radially extending from the outer vessel 2. This tubular socket 7 is closed at the outer end and has an upper charging hole 8 which serves at the same time as discharge hole for the steam (Figs. 4 and 5). The casing 9 of the whistle 6 is mounted on the tubular socket 7 so that it can be turned around the same. The whistle casing 9 has a hole 11 and it is held in the operative position by means of a spring 12 wound around a central bolt 10. The tubular socket 7 is slightly conical, in order to secure a permanent good packing of the whistle.

In the position shown in Fig. 4 the whistle 6 is standing above the steam discharge hole 8 so that steam flowing out through this hole operates the whistle.

In the turned position shown in Fig. 5 the hole 11 of the casing 9 of the whistle registers with the hole 8 in the tubular socket so that water can be filled through these holes 11 and 8 into the hollow space 3.

The boiling pot, according to the invention, may be evidently used for other victuals than milk.

I claim:

1. A boiler for boiling milk, comprising in combination a milk vessel, a water vessel surrounding and steam-tightly connected to said milk vessel, a tubular socket serving as a steam chamber projecting radially from and communicating with the upper part of said water vessel, having a hole at the top, a tubular casing having a hole of corresponding shape and size to the hole in said socket, and a whistle projecting from said casing diametrically opposite the hole therein said casing adapted to be turned on said socket so as to alternately bring into register with the hole in said socket, the hole in said casing for the purpose of filling said water vessel or said whistle for the purpose of giving the warning signal as soon as the water in said water vessel commences to boil.

2. A boiler for boiling milk, comprising in combination a milk vessel, a water vessel surrounding and steam-tightly connected to said milk vessel, a tubular socket serving as a steam chamber projecting radially from and communicating with the upper part of said water vessel, having a hole at the top, a tubular casing rotatable on said socket having a hole of the same size and shape as and adapted to be brought into register with the hole in said tubular socket said whistle projecting from said casing diametrically opposite the hole in said casing adapted to be brought into register with the hole in said socket, an end wall on said casing having a central hole, a bolt extending through said hole in said end wall, and a spiral spring wound around said bolt adapted to hold said casing securely on said tubular socket and prevent said casing from accidentally turning on said socket.

In testimony whereof I affix my signature.

WILHELM LAMBACH.